March 8, 1927.　　　　　M. LESLIE　　　　　1,619,945

CURTAIN

Filed Dec. 10, 1925

Maud Leslie
Inventor

By C. A. Snow & Co.
Attorneys.

Patented Mar. 8, 1927.

1,619,945

UNITED STATES PATENT OFFICE.

MAUD LESLIE, OF PAINTSVILLE, KENTUCKY.

CURTAIN.

Application filed December 10, 1925. Serial No. 74,574.

This invention relates to a curtain of that type designed, primarily, for use as a sun shade or the like on porches and at other points exposed to the weather.

It is an object of the present invention to provide a curtain which not only acts as a sun shade but also provides excellent ventilation and at the same time discourages unnecessary handling.

Another object is to utilize, in the construction of the curtain, objects, namely gum balls, which heretofore have been a waste natural product.

A still further object is to provide a curtain which is durable and inexpensive and which presents an attractive appearance.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
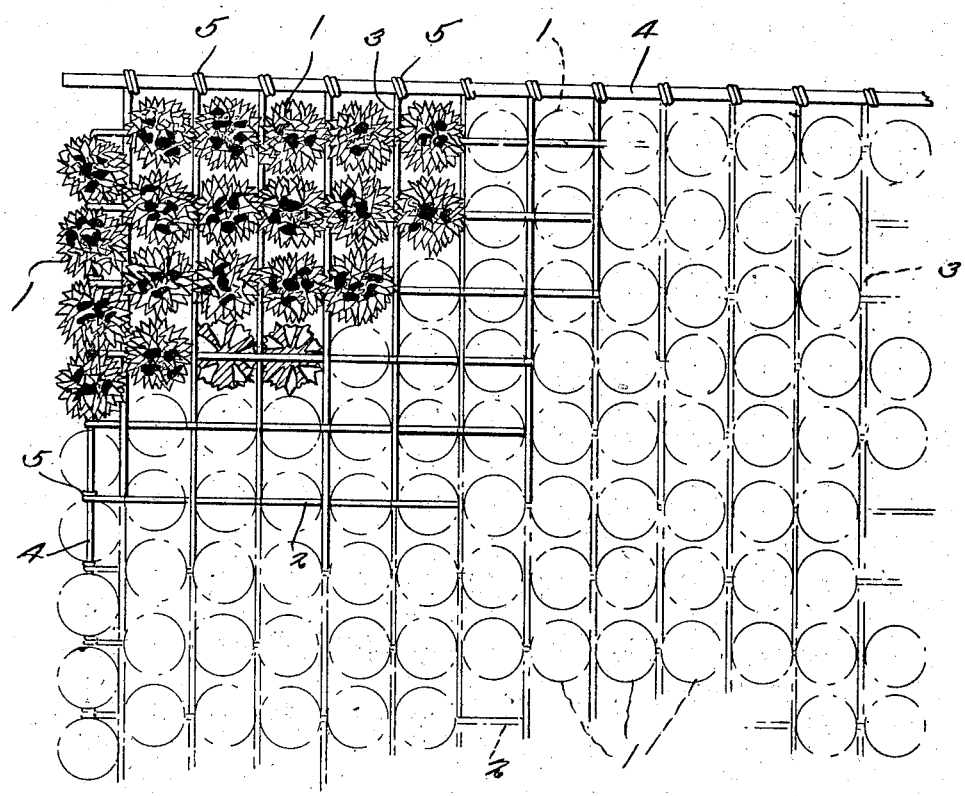
Figure 1 is an elevation of a portion of a curtain embodying the present improvements, parts being broken away.
Figure 2:
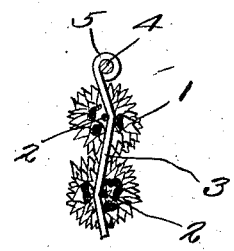
Figure 2 is a section taken transversely through one end portion of the curtain.

Referring to the figures by characters of reference 1 designates gum balls which grow in profusion in some portions of the United States and have had no commercial value. In carrying out the present invention these gum balls are boiled in linseed oil until thoroughly saturated therewith. It has been found that after the gum balls have thus been treated and allowed to dry they become extremely tough and hard. The gum balls are then threaded on wires 2 interwoven with other wires 3, the ends of the wires being twisted or otherwise placed in engagement with marginal wires 4, as indicated at 5. The wires are so located as to form a coarse mesh or network, the gum balls being disposed in parallel rows between the wires 3 and along the wires 2. The gum balls are supported close together, leaving irregular spaces between them through which air can circulate freely. By reason of the spongy nature of the gum balls, with the many air cells in them, they constitute heat insulators and this constitutes one reason why a curtain or the like made of gum balls is especially useful as a shade or curtain for porches or the like. As the gum balls are formed with sharp points, the curtains or shades made from them will not be handled unnecessarily and, furthermore, rodents and other small animals will not climb the curtain or shade.

Obviously the balls can be stained or otherwise colored and attractive patterns can be produced in this way. Furthermore instead of arranging the gum balls on a square mesh fabric, such as shown, they can be used in cooperation with other kinds of wire fabrics or even with fabrics formed of flexible cords instead of wires.

What is claimed is:

1. A curtain including gum balls hardened by boiling in linseed oil, and a fabric, some of the strands of the fabric being extended through the gum balls.

2. A curtain including an open mesh fabric and hardened gum balls disposed close together to provide irregular interstices therebetween, some of the strands of fabric being threaded through the gum balls.

3. A curtain including an open mesh fabric, and a plurality of hard balls threaded on some of the strands and the fabric, each ball having sharp points radiating therefrom.

4. A curtain including an open mesh fabric and hard cellular balls mounted on certain of the strands of the fabric to provide heat insulating means, there being hard sharp prongs radiating from each of the balls and constituting rodent repelling means.

In testimony that I claim the foregoing as my own, I have hereto affixed my signature.

MAUD LESLIE.